(12) United States Patent
Okubo et al.

(10) Patent No.: US 8,950,056 B2
(45) Date of Patent: Feb. 10, 2015

(54) METHOD FOR MANUFACTURING ELEMENT FOR BELT OF CONTINUOUSLY VARIABLE TRANSMISSION

(75) Inventors: Naruhiko Okubo, Tochigi (JP); Kazuyuki Sanda, Tochigi (JP); Shinsuke Ohnishi, Tochigi (JP); Shintaro Nakamura, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 619 days.

(21) Appl. No.: 13/265,759

(22) PCT Filed: Mar. 24, 2010

(86) PCT No.: PCT/JP2010/055074
§ 371 (c)(1),
(2), (4) Date: Oct. 21, 2011

(87) PCT Pub. No.: WO2010/125876
PCT Pub. Date: Nov. 4, 2010

(65) Prior Publication Data
US 2012/0036704 A1    Feb. 16, 2012

(30) Foreign Application Priority Data
Apr. 27, 2009   (JP) .................................. 2009-107714

(51) Int. Cl.
*B23P 13/04*     (2006.01)
*B21D 28/00*    (2006.01)
(Continued)

(52) U.S. Cl.
CPC ................ *B21D 53/14* (2013.01); *B21D 28/06* (2013.01); *B21K 23/00* (2013.01); *B21K 23/02* (2013.01); *F16G 5/16* (2013.01)
USPC ................... 29/558; 29/557; 72/334; 72/336; 72/338; 72/405.06

(58) Field of Classification Search
CPC ........ B21K 23/00; B21K 23/02; B21D 53/14; B21D 28/06; F16G 5/16
USPC .............. 29/558, 557; 72/324, 334, 336, 338, 72/405.06
See application file for complete search history.

(56) References Cited

U.S. PATENT DOCUMENTS
4,894,049 A    1/1990  Koppelaars
6,453,716 B2   9/2002  Suzuki
(Continued)

FOREIGN PATENT DOCUMENTS
CN    101061330 A    10/2007
JP    63-199943 A     8/1988
(Continued)

OTHER PUBLICATIONS
Machine Translation of JP 2004-10745 A (also published under EP 1371431 A2).*

*Primary Examiner* — Sarang Afzali
(74) *Attorney, Agent, or Firm* — Carrier Blackman & Associates, P.C.; Joseph P. Carrier; Anne G. Sabourin

(57) ABSTRACT

Disclosed is a method for manufacturing an element for a CVT belt, comprising a body portion (22L, 22R) having right and left sides and a tapered portion with a downwardly reducing width, a neck portion extending upward from the body portion, and a head portion extending upward from the neck portion. The manufacturing method comprises a first punching step in which a metal strip blank (31) which has a uniform thickness and a width which makes it possible obtain elements arrayed on an even number of lines in an arrangement in which the head portions are opposed to each other or an arrangement in which the body portions are opposed to each other, is punched along an outline ((33L, 33R) of an excess material (21*b*) added to profiles of the left and right sides (21L, 21R) of the body portions, and along an outline (58L, 58R) of an excess material (32*b*) added to a profile of a lower side (32L, 32R) of the body portion; a plastic deformation step in which the blank is compressed in the thickness direction to form a predetermined projection and depression, and form the tapered portion while displacing the material in the outline directions; and a second punching step in which the element is obtained as a product by punching the blank.

3 Claims, 14 Drawing Sheets

(51) Int. Cl.
*B21D 53/14* (2006.01)
*B21D 28/06* (2006.01)
*B21K 23/00* (2006.01)
*B21K 23/02* (2006.01)
*F16G 5/16* (2006.01)

(56) References Cited

U.S. PATENT DOCUMENTS

| | | | |
|---|---|---|---|
| 6,526,798 B2 * | 3/2003 | Suzuki | 72/330 |
| 6,904,782 B2 * | 6/2005 | Suzuki | 72/329 |
| 6,951,124 B2 | 10/2005 | Kanamaru et al. | |
| 8,104,159 B2 | 1/2012 | Hattori et al. | |
| 2006/0135306 A1 | 6/2006 | Hattori et al. | |

FOREIGN PATENT DOCUMENTS

| | | | |
|---|---|---|---|
| JP | 2002-213539 A | 7/2002 | |
| JP | 2004-017045 A | 1/2004 | |
| JP | 3703678 B2 | 10/2005 | |

* cited by examiner (a)

(b)

(a)

(b)

(a)

(b)

(a)

(b)

(c)

(d)

METHOD FOR MANUFACTURING ELEMENT FOR BELT OF CONTINUOUSLY VARIABLE TRANSMISSION

TECHNICAL FIELD

The present invention relates to a method of manufacturing an element that is a constituent component of a belt housed in a continuously variable transmission (CVT).

BACKGROUND ART

The CVT has widely been employed in a vehicle driving system. The CVT incorporates a metal belt that includes a metal member called an element. Prior art techniques related to the element are disclosed in Patent Documents 1 and 2.

The technique disclosed in Patent Document 1 will be described with reference to FIG. 17 hereof.

FIG. 17 is a diagram for explaining a conventional method of manufacturing an element for a CVT belt, in which a coiled material 100 is fed as indicated by an arrow 101, during which a large U-shaped relief opening 102 is first punched and then a plurality of recesses 103, 104, and 105 are formed. Finally, an element 110 is cut out from the coiled material 100, the element 110 including a body portion 107, a neck portion 108 extending from the body portion 107, and a head portion 109 disposed at the tip of the neck portion 108.

This is advantageous in the mass-productivity of the element 110 due to the continuous manufacture of the element 110 from the coiled material 100.

However, the ratio of the area of the element 110 to the area of the coiled material 100 is small, resulting in a poor yield.

A measure to improve the yield is proposed in Patent Document 2.

A technique disposed in Patent Document 2 will be described with reference to FIG. 18.

FIG. 18 is a diagram for explaining another conventional method of manufacturing an element for a CVT belt.

As depicted in (a) of FIG. 18, an element 120 includes a body portion 121, a neck portion 122 extending upwardly from the body portion 121, and a head portion 123 disposed on top of the neck portion 122.

As depicted in (b) of FIG. 18 that is a cross-sectional view taken along line b-b of (a), the body portion 121 is provided with a downwardly projecting taper portion 124, and the head portion 123 is provided with a raised portion called a nose 125 and a recessed portion called a hole 126.

The element 120 having such a shape is manufactured through (c) and (d) of FIG. 18.

That is, as depicted in (c), the taper portions 124, 124 are formed on the underside of a strip stock 127. This forming is carried out by causing the strip stock 127 to pass through between specialized reduction rolls.

Next, as depicted in (d), the nose 125 and the hole 126 are formed, and finally, left and right, two elements 120, 120 are obtained by blanking.

The yield is improved since the left and right, two elements 120, 120 can be obtained. However, the production cost increases due to the necessity of a specialized rolling machine to form the taper portions 124, 124. That is, the presence of a separate taper portion forming step induces an increase of the production cost.

An element manufacturing method is thus required in which the taper portion forming step depicted in (c) can be omitted.

PRIOR ART LITERATURE

Patent Literature

Patent Document 1: Japanese Patent Application Laid-Open Publication No. 2002-213539
Patent Document 2: Japanese Patent Publication No. 3703678

SUMMARY OF INVENTION

Technical Problem

To meet the above requirement, an object of the present invention is to provide an element manufacturing method capable of omitting the taper portion forming step.

Solution to Problem

According to an aspect of the present invention, there is provided a method of manufacturing an element for a continuously variable transmission belt, the element including a body portion having left and right lateral sides abutting respectively against left and right pulley halves of a pulley of a continuously variable transmission and having a downwardly tapered taper portion; a neck portion extending upwardly from the body portion; and a head portion extending upwardly from the neck portion, the method comprising a step of preparing a metal strip-shaped stock having a uniform thickness and a width enough to acquire even columns of elements in one form of a form where the head portions confront each other and a form where the body portions confront each other; a first blanking step of blanking the metal strip-shaped stock along contour lines of excess metals added to contours of the left and right lateral sides of the body portion for promoting subsequent working steps and along a contour line of an excess metal added to a contour of the bottom side of the body portion for promoting subsequent working steps; a plastic working step of compressing the stock in a thickness direction to form predetermined recessed and raised portions and to form the taper portion while causing the metals to flow to the edge; and a second blanking step of cutting out the element as a product from the stock.

The manufacturing method preferably further comprises a slit forming step of punching and forming a slit between the confronting head portions in the form where the head portions confront each other.

Preferably, the first blanking step in the form where the head portions confront each other is carried out by setting an actual plastic working volume corresponding to a volume of the product to 80% or less of a reference plastic working volume, the actual plastic working volume being defined by multiplying by a thickness of the stock an area that is enclosed by the contour lines of the excess metals added to the contours of the left and right lateral sides of the body portion, the contour line of the excess metal added to the contour of the bottom side of the body portion, and a taper starting line of the taper portion, the reference plastic working volume being defined by multiplying by the thickness of the stock an area that is enclosed by the contour lines of the excess metals added to the left and right lateral sides of the body portion, an edge in a width direction of the stock before the blanking work, and the taper starting line of the taper portion.

Desirably, the first blanking step in the form where the head portions confront each other is carried out by setting an actual plastic working volume corresponding to a volume of the product to 48% or less of a reference plastic working volume, the actual plastic working volume being defined by multiplying by a thickness of the stock an area that is enclosed by the contour lines of the excess metals added to the contours of the left and right lateral sides of the body portion, the contour line of the excess metal added to the contour of the bottom side of the body portion, and a taper starting line of the taper portion, the reference plastic working volume being defined by multiplying by the thickness of the stock an area that is enclosed by the contour lines of the excess metals added to the contours of the left and right lateral sides of the body portion, an edge in a width direction of the stock before the blanking work, and the taper starting line of the taper portion.

Advantageous Effects of Invention

According to the method of manufacturing an element for a continuously variable transmission belt of the present invention, there is included the first blanking step of blanking the metal strip-shaped stock along lines described by adding excess metals to contours of the left and right lateral sides of the body portion and along a contour line described by adding an excess metal to a contour of the bottom side thereof. Then, at the next plastic working step, the stock is compressed in a thickness direction to form predetermined recessed and raised portions and to form the taper portion while causing the metals to flow to the edge. That is, according to the present invention, the taper portion is also formed at the plastic working step for forming the predetermined recessed and raised portions. As a result, a separate taper portion forming step can be omitted.

If the prepared stock is immediately subjected to the plastic working, the flow of metals to the bottom side is impeded, so that the body portion becomes thick.

In this respect, in the present invention, blanking was performed along the lines described by adding excess metals to the contours of the left and right lateral sides of the body portion and along the contour line described by adding an excess metal to the contour of the bottom side thereof. By virtue of this blanking, a sufficient flow of the metals to the bottom side is achieved.

As a result, an element with a high dimensional accuracy can be manufactured in spite of the omission of the separate taper portion forming step.

Further included is the slit forming step of punching and forming a slit between the opposed head portions in the form where the head portions confront each other. Due to the formation of the slit between the head portion and the head portion, the stock can have a predetermined thickness without an increase in the thickness of the body portion.

As a result, an element with a still higher dimensional accuracy can be manufactured in spite of the omission of the separate taper portion forming step.

Furthermore, by setting (actual plastic working volume/reference plastic working volume) to 80% or less, a smooth metal flow is ensured enabling an element with a high dimensional accuracy to be manufactured.

Preferably, by setting (actual plastic working volume/reference plastic working volume) to 48% or less, a more smooth metal flow is ensured enabling an element with a still higher dimensional accuracy to be manufactured.

DESCRIPTION OF EMBODIMENTS

Figure 1:
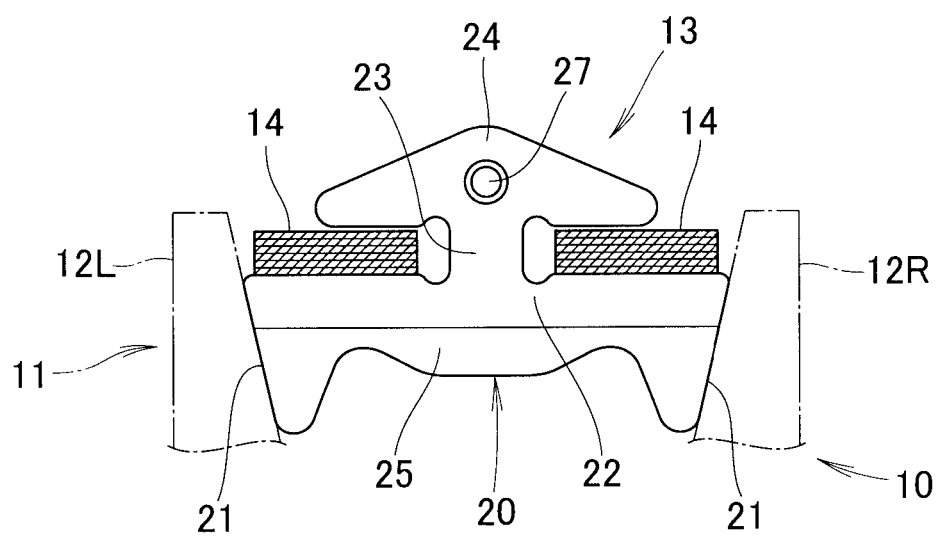
FIG. 1 is a schematic view illustrating an essential part of a continuously variable transmission.

Certain modes for carrying out the present invention will now be described with reference to the accompanying drawings.

An embodiment of the present invention will be described referring to the drawings.

As depicted in FIG. 1, a continuously variable transmission (CVT) 10 includes as its main components a pair of pulleys 11 (only one is shown), and a belt 13 wound around the pulleys 11.

The belt 13 includes layered rings 14, 14 composed of endless metal rings laid one upon another, and an element 20 supported by the layered rings 14, 14.

The element 20 includes a laterally elongated body portion 22 having left and right lateral sides 21, 21 abutting against left and right halves 12L, 12R of the pulley 11, a reduced-width neck portion 23 extending upwardly from the body portion 22, and a triangular head portion 24 disposed on top of the neck portion 23.

Figure 2:
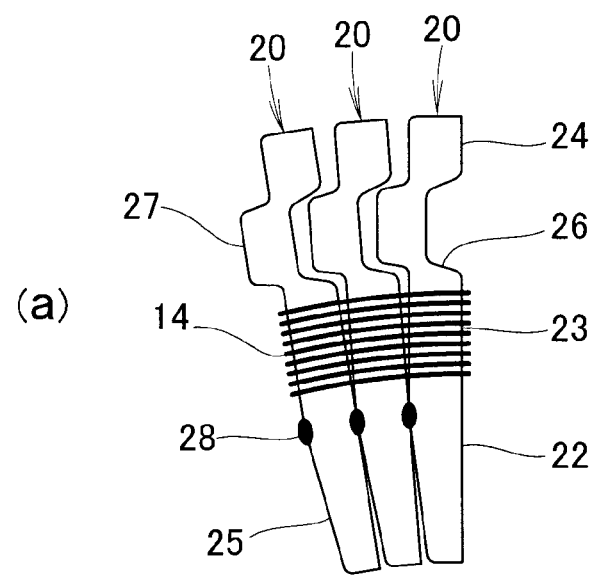
FIG. 2 is a cross-sectional view illustrating a continuously variable transmission belt.
Figure 2:
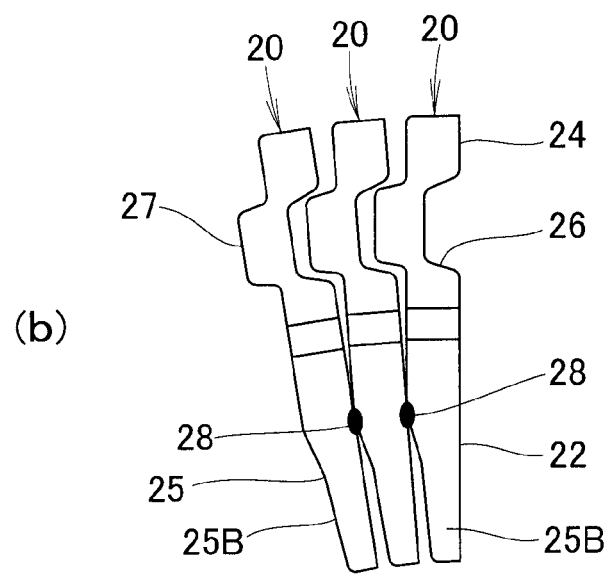

As depicted in (a) of FIG. 2, the body portion 22 has a downwardly tapered taper portion 25, and the head portion 24 has a hole 26 and a complementarily shaped nose 27 that can enter the hole 26.

The taper portion 25 may have a downwardly extending parallel-thin-walled portion 25b as depicted in (b) of FIG. 2.

Since the body portion 22 is provided with the downwardly tapered taper portion 25, the head portions 24 are spaced apart from each other while coming into point-contact at black points 28 and bend so as to have a radius of curvature corresponding to the diameter (pitch circle diameter) of the pulley. For this reason, the belt 14 exerts a bending function similar to that of the ordinary chain or belt.

A method of manufacturing the element 20 will next be described.

Figure 3:
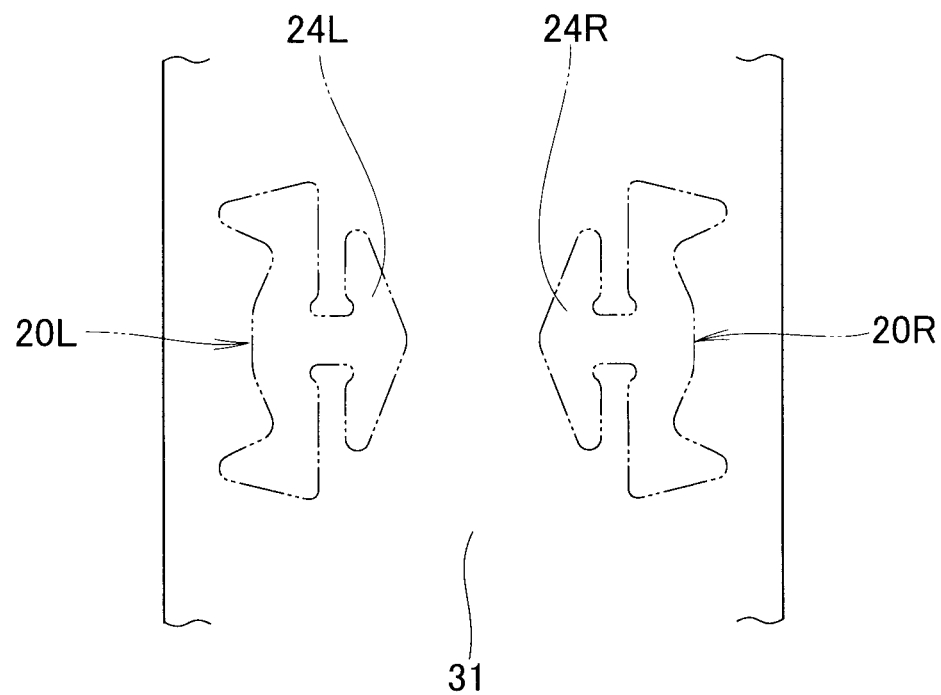
FIG. 3 is a diagram illustrating a preparation step in a manufacturing method of the present invention.

First, a stock 31 depicted in FIG. 3 is prepared. The stock 31 is called also the coiled material or a steel strip. A metal strip-shaped stock 31 is prepared that has a uniform thickness (plate thickness) and a width enough to cut out two elements 20L and 20R (L and R are added for convenience to distinguish the positions. L represents left and R represents right. The same applies hereinafter) in such a manner that the respective head portions 24L and 24R confront each other (preparation step).

The prepared stock 31 may be of a form described hereinbelow.

Figure 4:
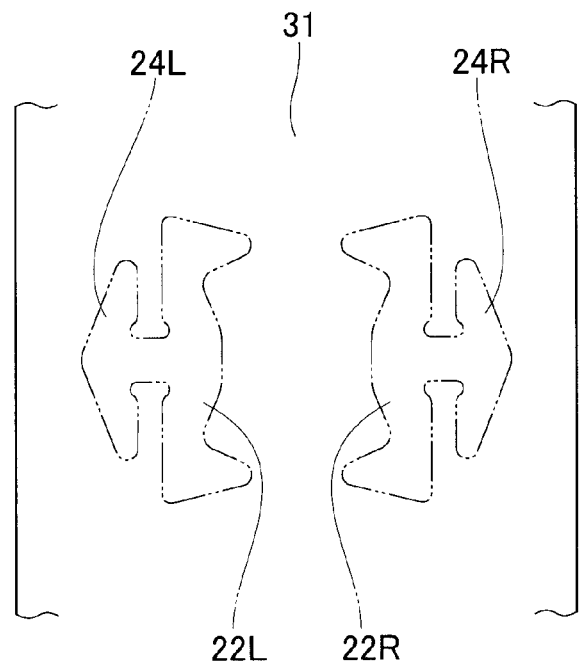
FIG. 4 is a diagram illustrating another mode of the preparation step of FIG. 3.

That is, as depicted in FIG. 4, the stock 31 may be prepared such that body portions 22L and 22R confront each other.

Figure 5:
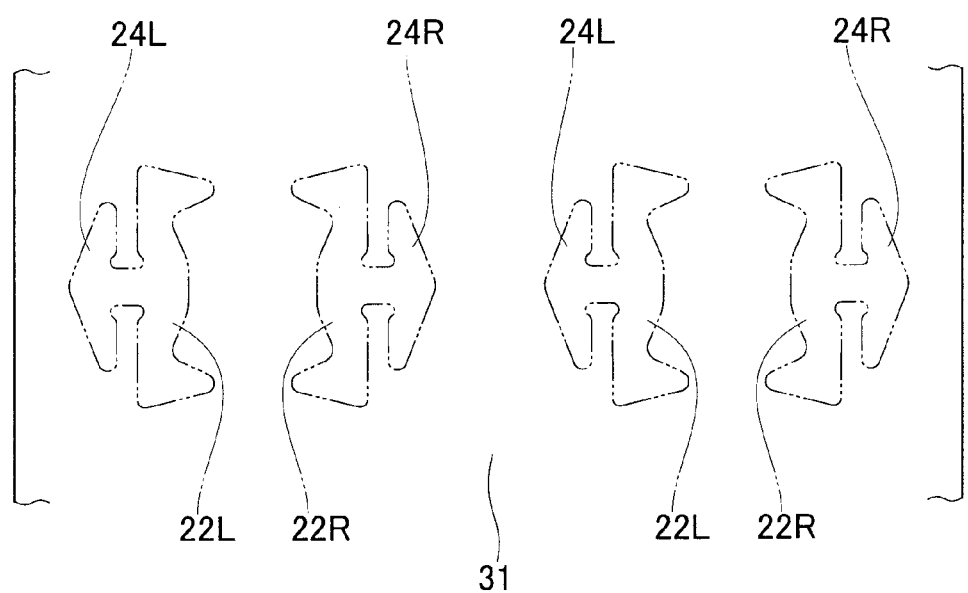
FIG. 5 is a diagram illustrating a further mode of the preparation step of FIG. 3.

Alternatively, as depicted in FIG. 5, the stock 31 may be prepared such that four rows of elements are arranged in the width direction with the head portions 24L and 24R confronting each other and with the body portions 22L and 22R confronting each other.

Figure 6:
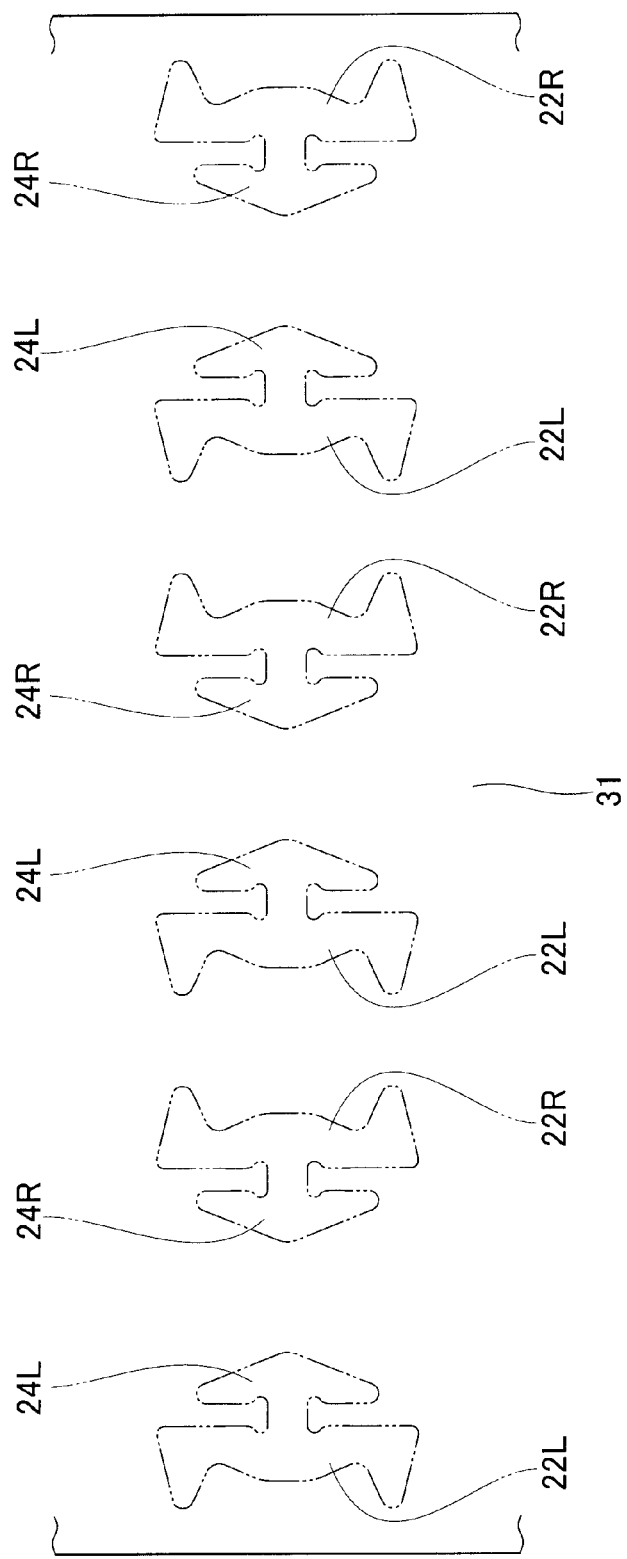
FIG. 6 is a diagram illustrating a still further mode of the preparation step of FIG. 3.

Furthermore, as depicted in FIG. 6, the stock 31 may be prepared such that six rows of elements are arranged in the width direction with the head portions 24L and 24R confronting each other and with the body portions 22L and 22R confronting each other.

An important thing here is that the metal strip-shaped stock 31 having a uniform thickness is prepared in such a manner that the adjacent elements 20L and 20R are arranged with their respective head portions 24L and 24R facing each other or with their respective body portions 22L and 22L facing each other.

Next, the stock 31 is partially notched (first blanking step).

The size of a notched region (area or volume) is important for carrying out the invention. Thus, to clarify and facilitate the description of the notched region (area or volume), definition will be given of a reference plastic working volume and an actual plastic working volume.

The reference plastic working volume will be described with reference to (a) of FIG. 7. A region (a hatched region) is determined that is enclosed by contour lines 33L, 33L described by adding excess metals 21a, 21a to contours of the left and right lateral sides (upper and lower in the diagram) 21L, 21L of the body portion 22L on the left of the diagram, an edge 57L in the width direction of the stock, and a taper portion starting line 39L. The taper portion starting line 39L will be described in detail referring to FIG. 11.

A volume is obtained by multiplying the area of the region (hatched region) enclosed by the four lines 33L, 33L, 57L, and 39L by the thickness of the stock. This volume is defined as the reference plastic working volume of the stock, and the volume at that time is represented as 100 percent. The same applies to the right part of the diagram, in which L is replaced with R.

The actual plastic working volume will next be described with reference to (b) of FIG. 7. A region (a hatched region) is determined that is enclosed by contour lines 33L, 33L described by adding excess metals 21b, 21b to contours of the left and right lateral sides 21L, 21L of the body portion 22L on the left of the diagram, a line 58L described by adding an excess metal 32b to a contour of a bottom side 32L of the body portion 22L, and the taper portion starting line 39L. A volume is obtained by multiplying the area of the region (hatched region) enclosed by the four lines 33L, 33L, 32L, and 39L by the thickness of the stock. This volume is defined as the actual plastic working volume of the stock. The same applies to the right part of the diagram, in which L is replaced with R.

Figure 7:
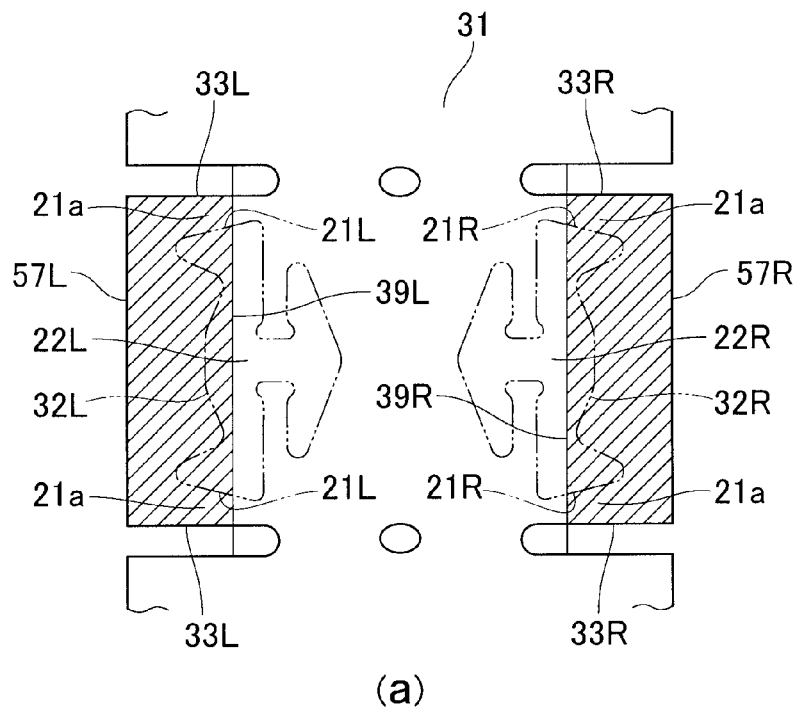
FIG. 7 is a diagram illustrating a first blanking step in the manufacturing method of the present invention.
Figure 7:
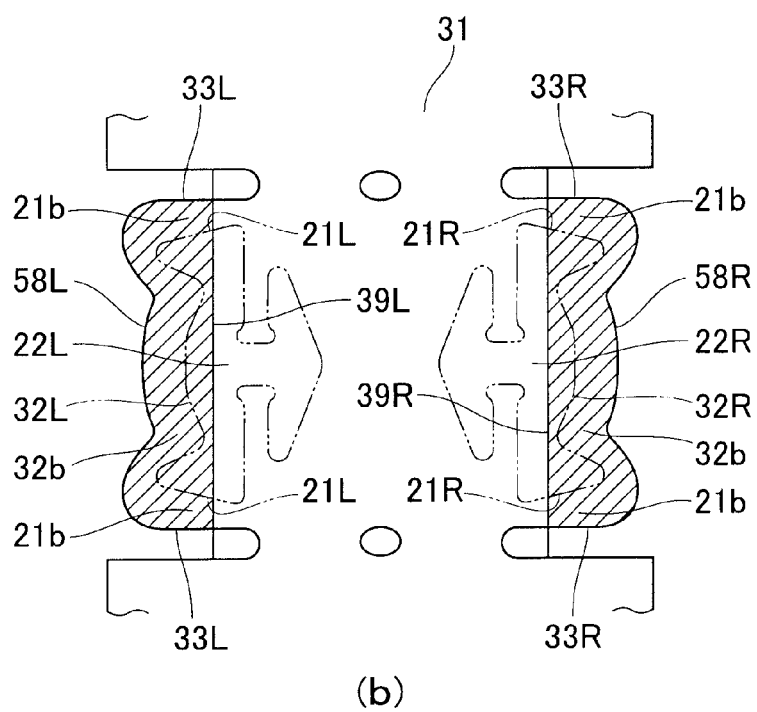

To obtain the form of (b) of FIG. 7, the stock 31 is blanked along the lines 33L, 58L, and 33L and the lines 33R, 58R, and 33R used as blanking lines (blanking step).

The lines 58L and 58R are determined based on the actual plastic working volume, and, although the reason thereof will be described later, a desired value of the actual plastic working volume is 80 percent or less, more preferably, 48 percent or less of the reference plastic working volume.

Figure 8:
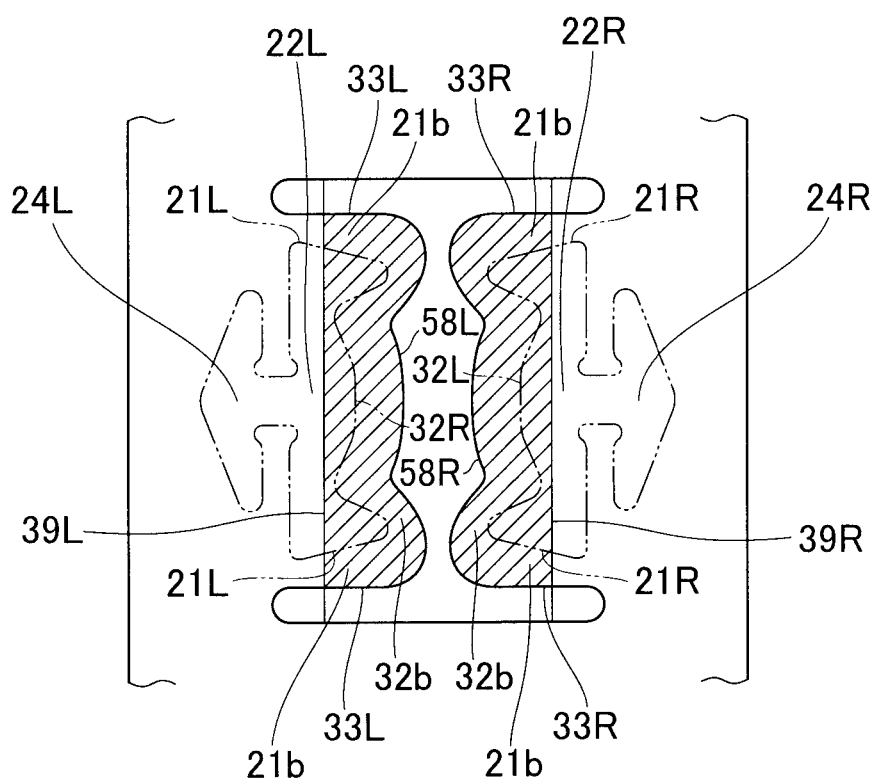
FIG. 8 is a diagram illustrating another mode of the first blanking step of FIG. 4.

As depicted in FIG. 8, a stock in the form of opposing the body portions 22L and 22R to each other may be blanked along the contour lines 33L, 58L, and 33L that are described by adding the excess metals 21b, 21b to the contours of the lateral sides 21L, 21L and by adding an excess metal to the contour 32b of the bottom side 32L, and along the contour lines 33R, 58R, and 33R. In this case as well, the desired value of the actual plastic working volume was 80 percent or less, more preferably, 48 percent or less of the reference plastic working volume.

Figure 9:
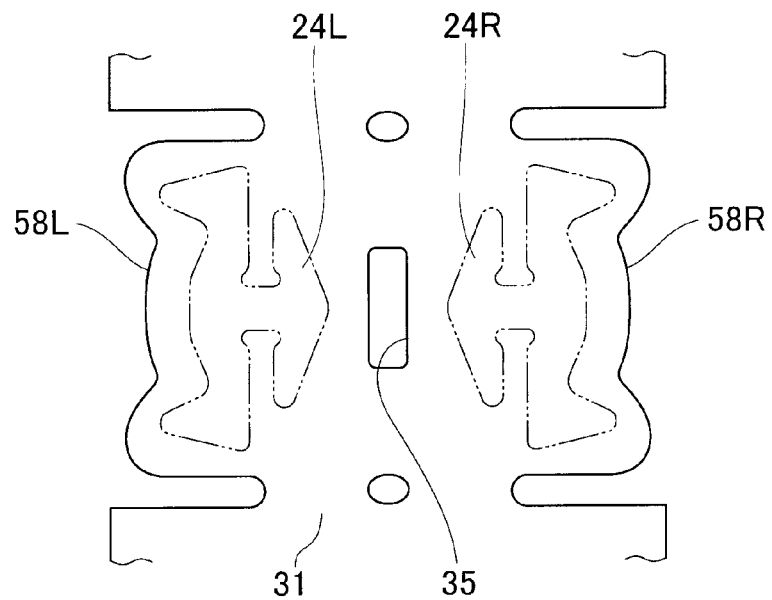
FIG. 9 is a diagram illustrating a slit forming step in the manufacturing method of the present invention.

Next, as depicted in FIG. 9, a substantially rectangular slit 35 is punched and formed between the opposed head portions 24L and 24R (slit forming step).

Although (the first blanking step) and (the slit forming step) are separately described in sequence, (the first blanking step) and (the slit forming step) may be performed at the same time in a press machine. At that time, the press machine can be of a compact size.

Figure 10:
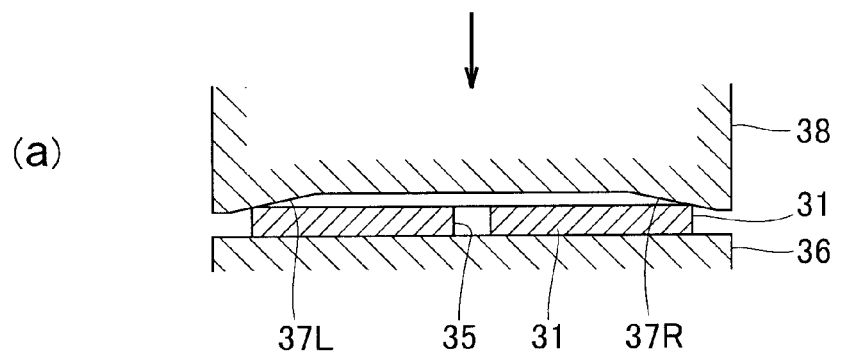
FIG. 10 is a diagram illustrating a plastic working step in the manufacturing method of the present invention.
Figure 10:
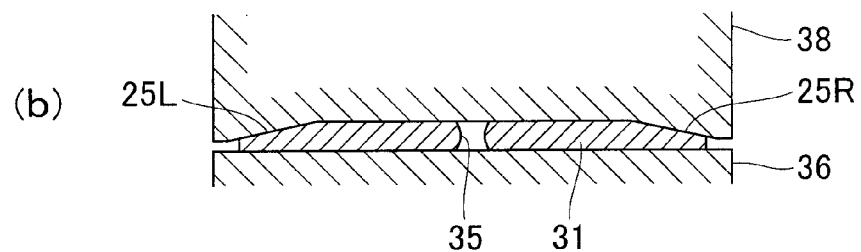

Next, the stock 31 is placed on a die 36 depicted in (a) of FIG. 10, and a punch 38 having slant surfaces 37L and 37R on the left and right is lowered so that the stock 31 is subjected to a plastic forming to reduce the plate thickness. The positional relationship between the die 36 and the punch 38 may be different from (a) of FIG. 10 in that the punch 38 is positioned below, that the stock 31 is placed on the punch 38, and that the die 36 is disposed above the punch 38 so as to subject the stock 31 to a plastic forming to reduce the plate thickness.

Then, as depicted in (b) of FIG. 10, the stock 31 is formed with a pair of taper portions 25L and 25R, and the slit 35 at the center has a reduced width (plastic working step).

Figure 11:
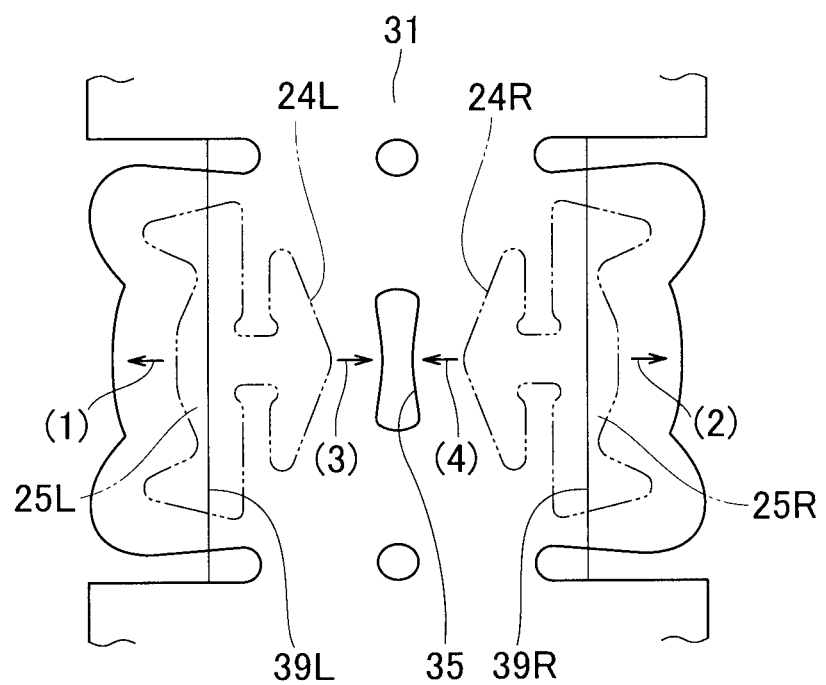
FIG. 11 is a top plan view illustrating the plastic working step.

In the plastic working step, as depicted in FIG. 11, the portion of the stock 31 on the left hand from a taper portion starting line 39L on the left of the diagram projects leftward as indicated by an arrow (1) to thereby ensure a smooth formation of the left taper portion 25L.

Similarly, a portion on the left hand from a taper portion starting line 39R on the right of the diagram projects rightward as indicated by an arrow (2) to thereby ensure a smooth formation of the right taper portion 25R.

Here, (actual plastic working volume/reference plastic working volume) will be considered.

For this consideration, multiple types of the plastic working part described in FIG. 11 were fabricated that include ones with the hatched region of 100 percent as described in (a) of FIG. 7 and ones with the hatched region less than 100 percent as described in (b) of FIG. 7.

Figure 12:
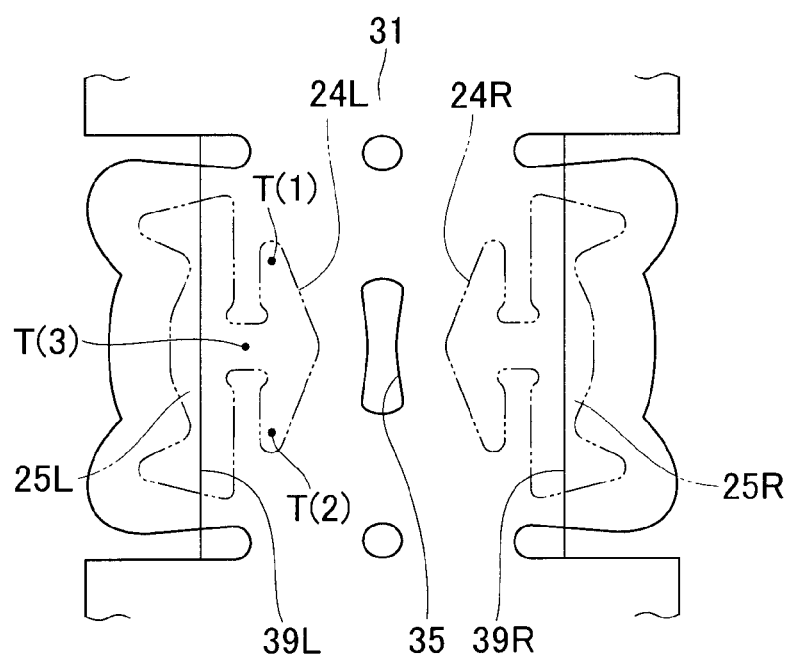
FIG. 12 is a diagram illustrating a proper value of an actual plastic working volume used in the manufacturing method of the present invention.
Figure 12:
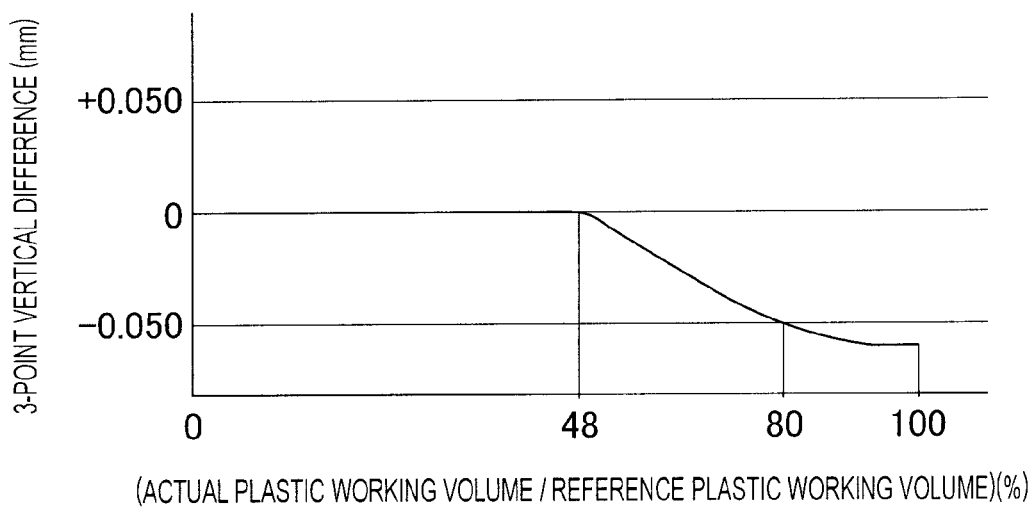

Next, as depicted in (a) of FIG. 12, thicknesses T(1) and T(2) at left and right ends of the head portion 24L were measured and a thickness T(3) of the neck portion was measured. Then, from the calculation of $(T(1)+T(2))/2-T(3)$, a vertical difference among three points is found.

More detailedly, in (actual plastic working volume/reference plastic working volume), measurement points were employed every 5 percent, and seven test pieces were prepared per one point.

Thus, 147 test pieces were subjected to the blanking step and the plastic working step of the present invention, to obtain the result depicted in (b) of FIG. 12 where an interpolation is made so that the points are smoothly joined together.

When the hatched region is large as depicted in (a) of FIG. 7, the flow of the metal upon the plastic working operation is prevented in the directions indicated by the arrows (1) and (2)

of FIG. 11, resulting in an uneven finish thickness. On the other hand, when the hatched region is small as depicted in (b) of FIG. 7, the flow of the metal upon the plastic working operation becomes smooth in the directions indicated by the arrows (1) and (2) of FIG. 11, resulting in an even finish thickness. For this reason, in (b) of FIG. 12, the three-point vertical difference was zero within the range of 0 to 48% (where the hatched portion is small), whereas the three-point vertical difference increased accordingly as approaching 100% after 48% was exceeded.

Thus, the desired value of the actual plastic working volume was set to 80 percent or less. Then, the three-point vertical difference fell within the range of −0.050 mm to +0.050 mm. More preferably, it was set to 48 percent or less. Then, the three-point vertical difference had a difference of 0 μm with respect to a target value 0 μm.

As depicted in FIG. 11, a portion of the left element on the right hand from the taper portion starting line 39L projects rightward as indicated by an arrow (3) and enters the slit 35. Similarly, a portion of the right element on the left hand from the taper portion starting line 39R projects leftward as indicated by an arrow (4) and enters the slit 35.

Figure 13:
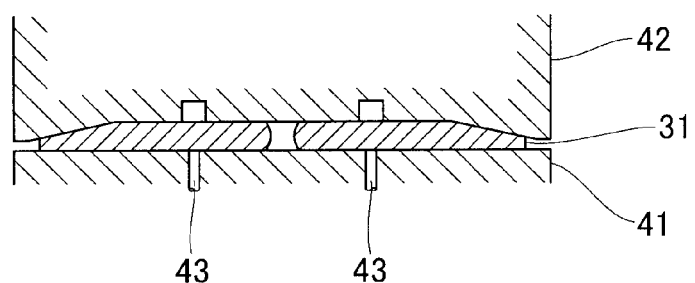
FIG. 13 is a diagram illustrating a step of forming a hole and a nose of an element of the belt.

Next, as depicted in FIG. 13, the stock 31 advanced in forming is retained by a lower die 41 and an upper die 42, and pins 43, 43 are thrust up from the low die 41 to form the hole and the nose (reference numerals 26 and 27 in FIG. 2). Since the formation of the hole and the nose is included in the plastic working operation, it may naturally be carried out at the same time in FIG. 10.

Accordingly, in the plastic working step, the taper portions 25L and 25R and the predetermined recessed and raised portions (the hole 26 and the nose 27) are formed while compressing the stock 31 with the notched portions 33L and 33R and the slit 35 in the thickness direction while causing the metal to flow to the notched portions 33L and 33R and the slit 35, whereupon an even plate thickness can easily be achieved.

Figure 14:
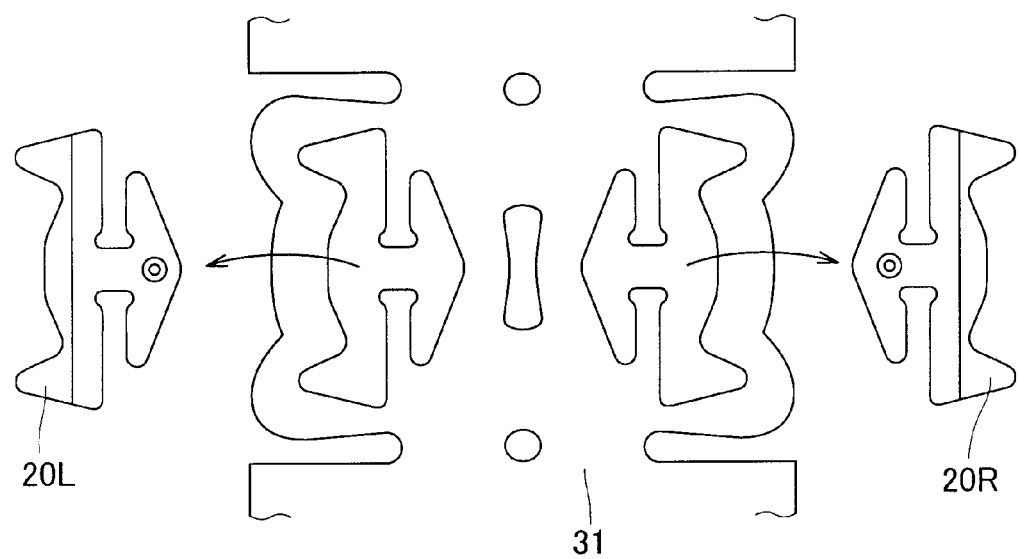
FIG. 14 is a diagram illustrating a second blanking step in the manufacturing method of the present invention.

Next, as depicted in FIG. 14, the elements 20L and 20R are cut out as products from the stock 31 (second blanking step). This step may be performed at the same time in FIG. 13. In that case, the positioning accuracy of the hole and nose is improved.

As a result, the elements with a high dimensional accuracy can be manufactured irrespective of omission of the separate taper portion forming step.

Description will next be given of a more preferred mode of the element for the continuously variable transmission manufactured by the manufacturing method as set forth hereinabove.

Figure 15:
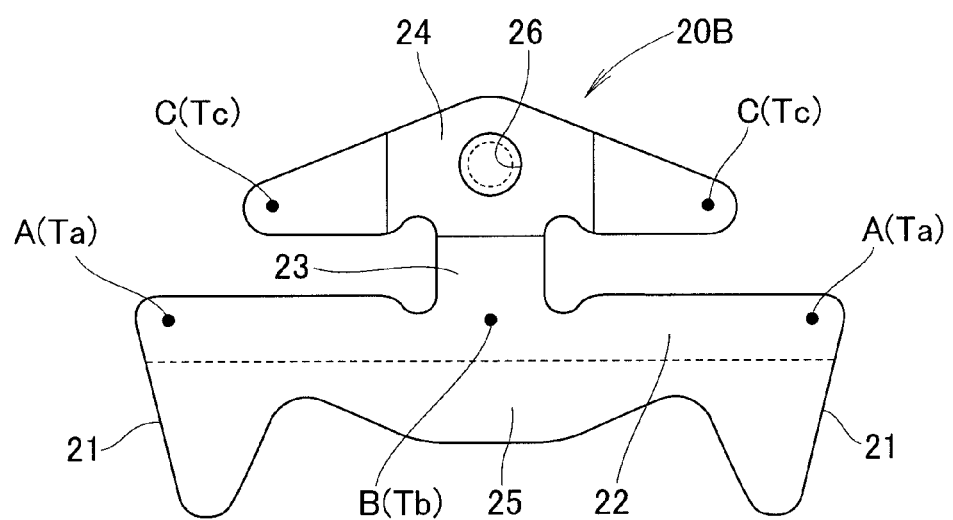
FIG. 15 is a front view of a preferred element.

As depicted in FIG. 15, in an element 20B including the body portion 22 having the left and right lateral sides 21, 21 in contact with the pulley of the continuously variable transmission and having the taper portion 25 that is downwardly convex in section, the neck portion 23 extended upwardly from the body portion 22, and the head portion 24 disposed on top of the neck portion 23, there are defined a point B at a center of the body portion 22 except the taper portion 25, points A, A at left and right ends of the body portion 22 except the taper portion 25, and points C, C at left and right ends of the head portion 24.

Then, the plate thicknesses at the points A, B, and C are denoted by Ta, Tb, and Tc, respectively. The plate thickness of the neck portion 23 is Tb equal to that at the point B. The plate thickness at the center of the head portion is denoted by Td (FIG. 16).

Figure 16:
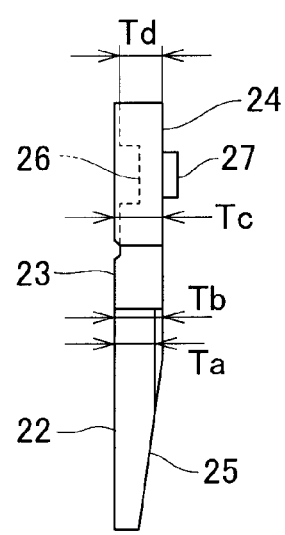
FIG. 16 is a side view of the preferred element.
Figure 17:
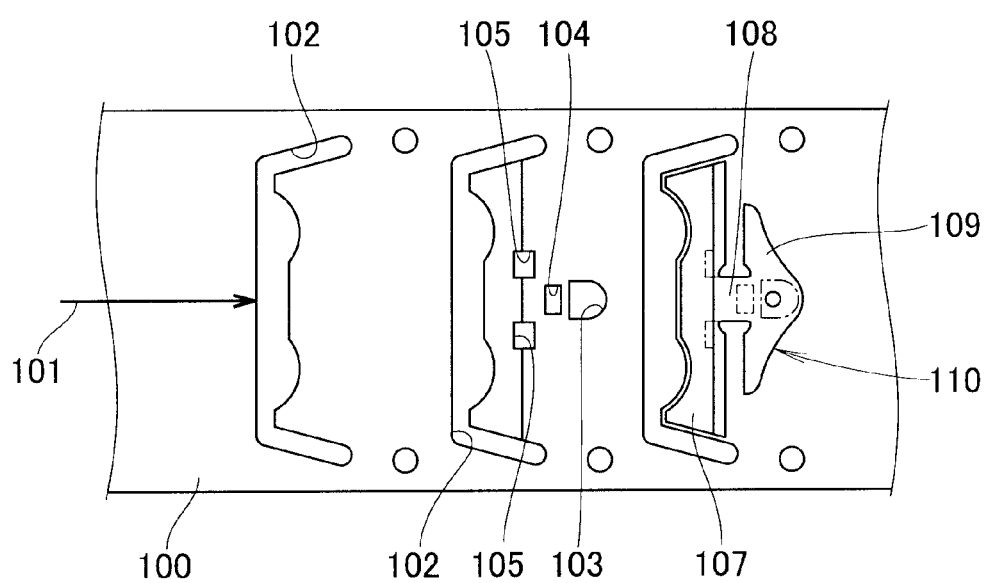
FIG. 17 is a diagram illustrating a conventional method of manufacturing an element for a CVT belt.
Figure 18:
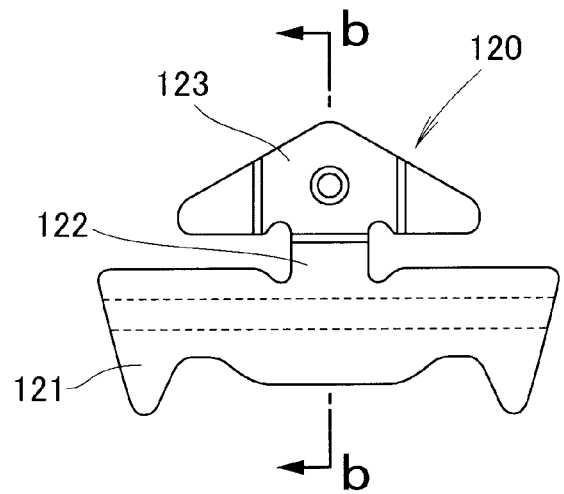
FIG. 18 is a diagram illustrating another conventional method of manufacturing an element for a CVT belt.
Figure 18:
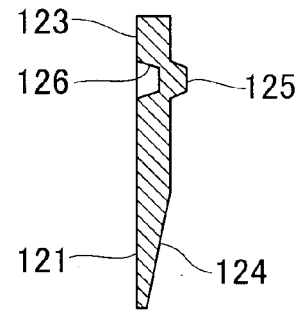
Figure 18:
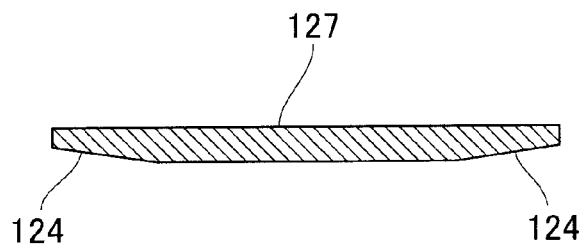
Figure 18:
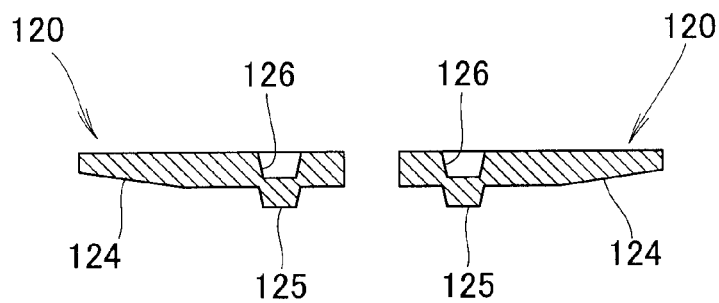

The mutual relationship among the plate thicknesses is represented as Ta<Tb≤Tc and Td<Tc as depicted in FIG. 16.

That is, in the element 20B including the body portion 22 that is positioned inside when arrayed overlapping one another annularly in the thickness direction while being in contact with the pulley of the continuously variable transmission and that is formed with the left and right lateral sides 21, 21 in contact with the pulley, the neck portion 23 that is formed extending toward the outer periphery of the body portion 22 and that has a width narrower than that of the body portion 22, and the head portion 24 that is positioned outside when laid annularly overlapping one another and that is disposed contiguously via the neck portion 23, the body portion 22 having at its substantially lower half the taper portion 25 that is formed to be thinner in plate thickness than the other portions, the head portion 24 has the plate thickness Tc at its left and right ends lying on both sides of a region (the center of the head portion 24) on top of the neck portion, the plate thickness Tc being larger than the plate thickness Td of the region on top of the neck portion, the neck portion 23 and the body portion 22 have the plate thicknesses Tb and Ta, respectively, that are smaller than the plate thickness Tc at the left and right ends of the head portion 24, and in the body portion 22 except the taper portion 25, the plate thickness Ta at the left and right ends of the body portion 22 is smaller than the plate thickness of a region under the neck portion, that is, the plate thickness Tb at the center of the body portion 22.

A belt obtained by arraying a plurality of the thus formed elements 20B in an annularly overlapping manner ensures a smooth curving deformation toward the inner periphery of the continuously variable transmission belt, thereby providing an excellent overlapping form without the overlapping direction of the elements bending toward the head portion.

Thus, when the continuously variable transmission belt is formed and passed around the pulleys of the continuously variable transmission, a deflection toward the outer periphery of the continuously variable transmission belt can be prevented so that a stable power transmission can be achieved in the continuously variable transmission without causing any damage to the metal rings and the elements making up the belt.

Additionally, when the plurality of elements are arrayed in an annularly overlapping manner, the adjacent elements contact one another at their respective relatively thick portions, that is, at their respective three sites (three points) consisting of the left and right ends (the points C, C) of the head and the region (the point B) under the neck, so that an extremely stable overlapping state can be achieved so as to prevent the meandering, etc., to ensure an effective power transmission when the continuously variable transmission belt is formed.

It is thus assured as depicted in FIGS. 15 and 16 that the plate thickness Ta at the point A is smaller securely than the plate thickness Tb at the point B and that the plate thickness Tb at the point B is equal to or smaller than the plate thickness Tc at the point C. As a result, when the continuously variable transmission belt is formed by arraying the plurality of elements in an annularly overlapping manner, a stable overlapping state can be obtained by virtue of the contacts of the points C and B. In addition, since the elements can securely be prevented from curving as to converge toward the head portions, a stable power transmission is ensured in the continuously variable transmission, free from any damage to the elements caused by an undesired contact with the endless multilayer ring when passed around the pulleys of the continuously variable transmission.

INDUSTRIAL APPLICABILITY

The present invention is best suited to the manufacture of the element that is a main component of the continuously variable transmission.

LIST OF REFERENCE SIGNS 10 continuously variable transmission (CVT)
11 pulley
12L, 12R pulley half
20, 20L, 20R, 20B element
21, 21L, 21R lateral side of body portion
21b excess metal added to contour of lateral side
22, 22L, 22R body portion
23 neck portion
24, 24L, 24R head portion
25 taper portion
31 stock
32L, 32R bottom side of body portion
32b excess metal added to contour of bottom side
33L, 33R notched portion
35 slit
36 die
38 punch
57L, 57R left and right edges of stock

The invention claimed is:

1. A method of manufacturing a continuously variable transmission belt element, the element including: a body portion having left and right lateral sides abutting respectively against left and right pulley halves of a pulley of a continuously variable transmission and having one of a downwardly tapered taper portion and a downwardly extending parallel thin-wall portion; a neck portion extending upwardly from the body portion; and a head portion extending upwardly from the neck portion and having a recess portion and a complementarily shaped raised portion, the method comprising:

a step of preparing a metal strip-shaped stock having a uniform thickness and a width enough to acquire even columns of elements in a form where the head portions confront each other;

a first blanking step of blanking the metal strip-shaped stock along contour lines defining contours of excess metal parts added to contours of the left and fight lateral sides of the body portion and along a contour line defining a contour of an excess metal part added to a contour of the bottom side of the body portion for promoting subsequent working steps, the first blanking step being carried out in a form where the head portions confront each other;

a slit forming step of punching and forming a substantially rectangular slit between the confronting head portions and at a position spaced from contour lines of the confronting head portions in the form where the head portions confront each other;

a plastic working step of compressing the metal strip-shaped stock in a thickness direction to form predetermined recessed and raised portions and to form the one of the taper portion and the parallel thin-wall portion while causing the metals to flow to the blanked contours of the excess metal parts and also to the slit; and a second blanking step of cutting out the element as a product from the metal strip-shaped stock.

2. The method of claim 1, wherein the first blanking step in the form where the head portions confront each other is carried out by setting an actual plastic working volume corresponding to a volume of the product to 80% or less of a reference plastic working volume, the actual plastic working volume being defined by multiplying by a thickness of the metal strip-shaped stock an area that is enclosed by the contour lines defining the contours of the excess metal parts added to the contours of the left and fight lateral sides of the body portion, the contour line defining the contour of the excess metal part added to the contour of the bottom side of the body portion, and one of a taper starting line of the taper portion and a starting line of the parallel thin-wall portion, the reference plastic working volume being defined by multiplying by the thickness of the metal strip-shaped stock an area that is enclosed by the contour lines defining the contours of the excess metal parts added to the left and right lateral sides of the body portion, an edge in a width direction of the metal strip-shaped stock before a blanking work of the first blanking step, and the one of the taper starting line of the taper portion and the starting line of the parallel thin-wall portion.

3. The method of claim 2, wherein the first blanking step in the form where the head portions confront each other is carried out by setting the actual plastic working volume corresponding to a volume of the product to 48% or less of the reference plastic working volume.

* * * * *